Dec. 7, 1937.    W. C. STARKEY    2,101,275
AUTOMOTIVE DRIVING MECHANISM
Filed May 15, 1933    2 Sheets-Sheet 1
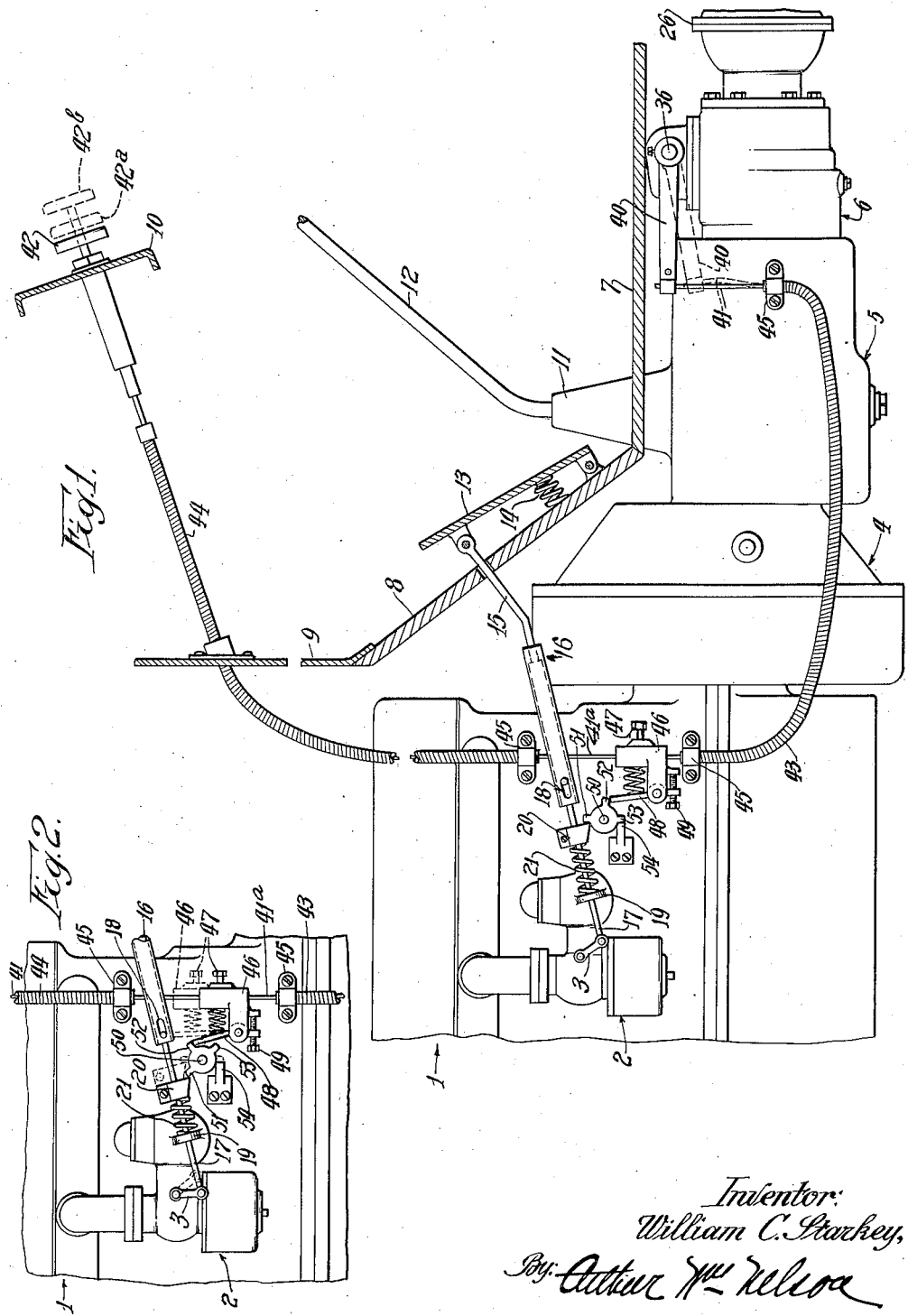
Inventor:
William C. Starkey,
By Arthur Wm Nelson
Atty.

Dec. 7, 1937. W. C. STARKEY 2,101,275
AUTOMOTIVE DRIVING MECHANISM
Filed May 15, 1933 2 Sheets-Sheet 2

Inventor:
William C. Starkey.
By Arthur McNelson
Atty.

Patented Dec. 7, 1937

2,101,275

UNITED STATES PATENT OFFICE 2,101,275

AUTOMOTIVE DRIVING MECHANISM

William C. Starkey, Indianapolis, Ind., assignor, by mesne assignments, to William C. Starkey, Raymond S. Pruitt, and Walter H. Beal, trustees Application May 15, 1933, Serial No. 671,058

21 Claims. (Cl. 192—.01)

This application is a continuation, at least in part, of my application for patent, Serial Number 616,930 filed June 13, 1932.

This invention relates to improvements in automotive driving mechanisms and it consists of the matters hereinafter described and more particularly pointed out in the appended claims.

In automobiles including free wheeling mechanism, it is often desired to lock out said mechanism to render the same inoperative so that the engine may be used in braking the movement of the automobile as when in descending certain grades. Such free wheeling mechanism includes two relatively rotative clutch members and a means associated therewith which in a rotative movement between them in one direction, clutches said members together.

In locking out said mechanism several expedients have been employed for the purpose but without material success for the reason that it is difficult to lock out said mechanism when the two relatively rotative members thereof rotate at different speeds. This condition is often met with in driving an automobile because it is generally desired to lock out said mechanism when the automobile is traveling under its own power and the transmission is in gear, the locking out rarely being attempted when the associated transmission is in neutral.

To accomplish a locking out of the free wheeling mechanism when the transmission is in gear and the automobile is under way, the ideal moment therefore is when the two relatively rotative members of the clutch are connected together by the clutching element and are rotating at substantially the same speed or, in other words, when they are synchronized. At this time, the lock out mechanism can be more easily engaged with said members to lock them together independently of the clutching element and with the least amount of noise and effort.

The primary object of the invention is to provide an automotive driving mechanism embodying a lock out mechanism for this purpose which is so connected to the accelerating mechanism of the associated engine in the automobile, that in the initial movement of the manually operated control of said lock out mechanism, the engine is momentarily accelerated to cause the two clutch members of the free wheeling mechanism to be substantially synchronized or brought up to the same speed, the final part of the movement of said control acting to complete the lock out when said two members are thus rotating at substantially the same speed.

A further object of the invention is to provide means in a mechanism of this kind which, though interconnected with the engine accelerating mechanism, is operable independently of the same and is in no manner affected when said accelerating mechanism is operated for its intended purpose in accelerating and decelerating the engine.

A further object of the invention is to provide a mechanism for this purpose which is simple in construction and is positive and fool-proof in operation, and in no manner confuses the operator, whether a novice or an expert driver.

The above-mentioned objects of the invention, as well as others, together with the many advantages thereof, will more fully and particularly appear as I proceed with my specification.

In the drawings:

Fig. 1 is a view in side elevation of one end of an automobile motor or engine and the associated change speed transmission and free wheeling mechanism unit, showing the relation of the same with respect to the floor, toe board, dash, instrument board, and the associated operating parts.

Fig. 2 is a view in elevation, on the same scale, of those parts connected to the accelerating mechanism for the motor or engine, with certain of said parts in a changed position.

Figure 3:
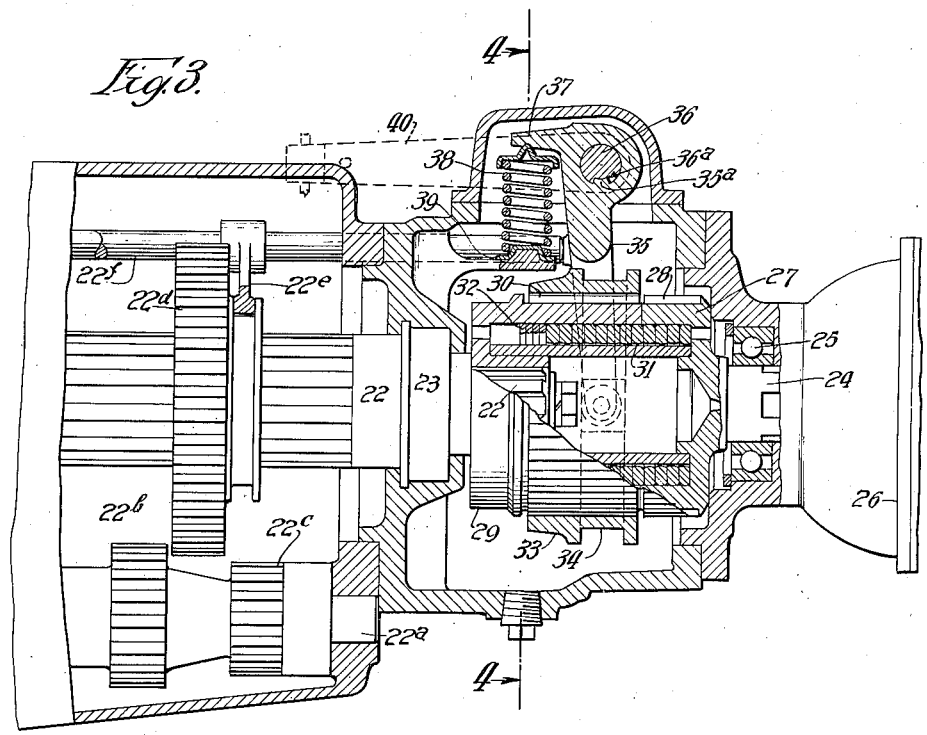
Fig. 3 is a longitudinal sectional view through the rear end of the change speed transmission and associated free wheeling unit of the improved automotive transmission mechanism, on an enlarged scale.
Figure 4:
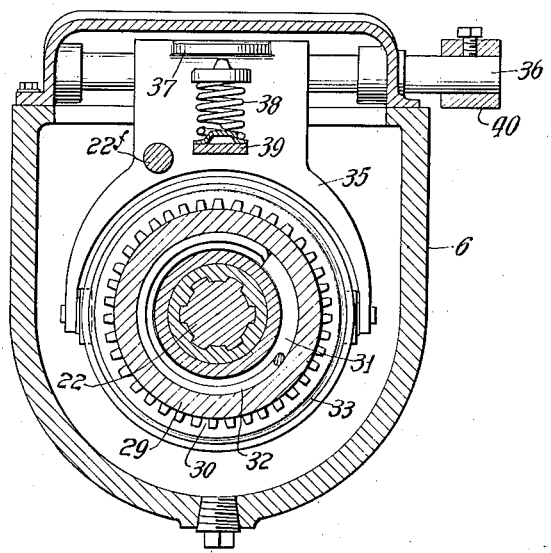
Fig. 4 is a transverse vertical sectional view through the free wheeling unit as taken on the line 4—4 of Fig. 3.

In general, my improved mechanism includes manually operable means for locking out the free wheeling mechanism and such means has its operating knob or button mounted in a position convenient for the operator. When mounted on the instrument board, connection is made through a Bowden wire with a lever outside the free wheeling unit to impart a rocking movement to the control collar shifting yoke therefor. Means are so disposed between the carburetor throttle lever and the Bowden wire that, in the initial part of the movement of the latter to accomplish a locking out operation, the engine is momentarily accelerated to first bring the two clutch members of the unit up to the same speed through the clutching element and then in the final movement thereof, complete the lock out at that moment or instant that the engine is decelerated, at which time the said two clutch members are in the most desirable condition for the same.

Referring now in detail to that embodiment of the invention illustrated in the accompanying drawings:

1 indicates the engine of an automobile and 2 the carburetor therefor including a throttle lever 3. The engine is operatively connected at its rear end by a main clutch bell housing 4 with the front end of a change speed transmission casing 5 which is provided at its rear end with a free wheeling unit casing 6.

Just above the transmission casing is the floor board 7 which terminates at its front end in an upwardly and forwardly inclined toe board 8 to meet the dash 9 of the automobile. 10 indicates the instrument board of the automobile.

Extending up through the floor board 7 is a transmission casing extension 11 in which the shift lever 12 for the transmission is mounted for universal movement in a manner providing for the selection of the desired speeds in forward or reverse.

On the toe board 8 is mounted the accelerating treadle 13 and a spring arrangement 14 is provided to return said treadle to normal position upon release of foot pressure thereon as when in decelerating. Operatively connected with the treadle and extending through the toe board is one part 15 of an accelerator rod 16, the other part 17 being operatively connected to the throttle lever 3 of the carburetor. The adjacent ends of said rod parts have a pin and slot connection 18 providing a relative movement of one part in one direction without affecting the other as will later appear.

The rod part 17 slides through a bearing collar 19 which may project laterally from the carburetor and to the rear of the same there is adjustably fixed to the said rod part a block-like pawl 20. A spring 21 surrounds said rod part 17 between said bearing and pawl and normally acts to urge said rod part rearwardly to swing the lever 3 into throttling or decelerated position. Thus, when foot pressure is exerted upon the treadle 13, the movement of the same operates through the rod parts mentioned to swing the throttle lever 3 clockwise to accelerate the engine, the springs 14 and 21 operating to restore said parts to normal when foot pressure is released from said treadle.

The transmission may be of any suitable kind providing the desired forward speeds and reverse, selective by proper manipulation of the shift lever 12. Said transmission includes a driven shaft 22 and a jack shaft 22a. The rear end of the driven shaft is journalled in suitable antifriction bearings 23 in the front wall of the free wheeling unit casing and projects beyond said bearing to terminate in said casing 6 as best shown in Fig. 3. On the jack shaft are the first speed forward and reverse gears 22b—22c respectively. Splined on the driven shaft is a shiftable gear 22d which when shifted forwardly engages the gear 22b to provide first speed forward for the driven shaft. When the gear 22d is shifted rearwardly it engages an idler gear (not shown) driven by the gear 22c to provide reverse for the shaft 22.

Shifting movement is imparted to the gear 22b by means of a yoke 22e carried by a shift rod or rail 22f, said rod being actuatable by the lever 12, when the latter is manipulated to operatively engage the same in the manner well known.

24 indicates the secondary driven shaft, axially in line with the shaft 22 and journalled midway between its ends in suitable antifriction bearings 25 in the rear wall of said free wheeling unit casing. The rear end of said secondary driven shaft projects beyond the rear wall of the casing 6 and has secured thereto the flange fitting 26 whereby said shaft may be operatively connected in the conventional manner to the associated propeller shaft.

On the front end of said secondary driven shaft within the casing is provided a forwardly facing, cup-shaped clutch member 27 which is externally splined as at 28. This clutch member coacts with a rearwardly facing cup-shaped clutch member 29 secured to that end of the shaft 22 extending into said casing 6 and which clutch member is externally splined as at 30.

The said cup-shaped clutch members coact to provide a chamber for a clutching element which in this instance, is a helically coiled spring 31 that is anchored at one end to the clutch member 27 and is provided at its other end with an energizing spring 32 having a slight frictional drag with respect to the clutch member 29.

When the said clutch members rotate relatively in one direction, the spring is caused to change its diameter in one direction and operatively connect said clutch members together. When the clutch member 27 tends to rotate faster than the clutch member 29, as when the automobile is being wheel driven under momentum or is coasting, then said spring is caused to change its diameter in the other direction and permit the clutch member 27 to overrun the clutch member 29.

Associated with said clutch members and normally surrounding the clutch member 29 is a lock out collar 33 that is internally splined for engagement with the external splines of said clutch members and the adjacent ends of spline teeth on said collar 33 and clutch member 27 respectively, are rounded or chamfered in the usual manner to facilitate engagement. In said collar is provided an external annular groove 34. Normally, said collar occupies a position surrounding only the clutch member 29 but it may be shifted longitudinally rearward to engage the clutch member 27 also, and lock said two clutch members together independently of the clutch spring previously mentioned.

35 indicates a yoke which is mounted at its top end for a limited rocking movement upon a transverse rock shaft 36 and the bottom end of the arms of said yoke operatively engage in opposite sides of the groove 34 in the collar 33. As shown herein, the shaft 36 is provided on its bottom side with a groove 36a of a width greater than that of a coacting spline 35a on the yoke.

Normally the spline occupies a position at the left hand side of the groove 36a as shown in Fig. 3. Thus when the shaft is rocked in a counterclockwise direction, as will later appear- the yoke moves therewith. However, by the construction described it is possible to swing the yoke counterclockwise, independent of the shaft within the limit permitted by the groove and spline arrangement. This independent movement of the yoke may be produced by the shift-rod or rail 22f before mentioned. In this respect said rod slides through suitable openings in the abutting end walls of the transmission and free wheel unit casings respectively and normally engages the front side of the yoke as best shown in Fig. 3.

The yoke 35 includes a relatively short, forwardly extending arm 37 at its top end which is operatively engaged with the top end of an expansion spring 38, the bottom end of said spring being normally engaged upon a support 39 provided therefor in the casing 6. As the said spring always exerts an upward lifting movement on the yoke arm 37, it is apparent that the yoke acts normally to hold the collar out of lock out position and in a position surrounding only the clutch member 29. However, when the shaft is rocked counterclockwise, as viewed in Fig. 3, said spring is compressed and the yoke acts to shift said collar rearwardly to connect said clutch members together independently of the clutch spring, which condition is termed the "lock out" position. When that force which rocked said shaft is released, then said spring acts through the yoke to return the collar to its normal position on the clutch member 29, so that said members may relatively rotate.

To that end of the rock shaft 36 beyond the left hand side of the casing 6 is fixed a lever or arm 40, as best shown in Fig. 1. To said arm is fixed one end of a Bowden wire 41, the other end of which is fixed to an operating push-pull button or knob 42 at the instrument board. Said wire extends through a suitable Bowden wire casing preferably made of two parts 43—44 so as to expose a portion 41a of said wire at a point between said ends. The Bowden wire casing mentioned is held in place by the usual clips 45 at the desired points in the manner well known.

Adjustably secured to the portion 41a of the Bowden wire 41 is a block 46, said block carrying a set screw 47 on one side whereby it may be secured in the desired position on said wire portion. On the other side of said block is provided a spring pressed pawl 48 which carries a set screw 49 for limiting the movement or swing of said pawl in one direction.

Pivoted at 50 on the engine 1 at a point adjacent the normal position of the pawl block 20 on the accelerator rod 17 is a member having radially extending top, side, and bottom extensions or fingers 51, 52, and 53, respectively. The top finger 51 is normally engaged with the pawl 20, the side finger 52 is normally engaged by the pawl 48, and the bottom finger 53 normally engages against a stop 54 provided therefor on the engine.

The parts as shown in Fig. 1 are in that position wherein the clutch members 27 and 29 may relatively rotate to provide free wheeling, the button or knob 42 being "in" or against the instrument board to present this condition visibly to the operator.

Assume that the automobile is traveling along in direct drive forward as provided by the transmission and in a free wheeling condition, and it is now desired to lock out said free wheeling action and thus provide a conventional drive for the automobile.

The operator grasps the button or knob 42 and pulls outwardly thereon. This pulling out of said button causes a movement of the Bowden wire and in the initial part of said movement, the block 46 moves upwardly with its associated wire portion 41a. In this upward movement of said block, the pawl 48 engaged under the finger 52 will tend to rotate the member mounted on the stud 50, counterclockwise. In said movement of said member, the finger 51 engaged with the pawl block 20 will force the same forwardly. As said pawl block is fixed to the rod section 17, this will compress the spring 21 and will swing the lever 3 clockwise to accelerate the engine, so that the parts are in that position best shown in Fig. 2.

At a certain point in the movement of the block 46, the pawl 48 will clear the finger 52, when the spring 21 will expand to return the parts to normal position and this will, of course, decelerate the engine. Thus, it is apparent that in the initial part of the pull on the Bowden wire, the engine is momentarily accelerated.

The initial movement of the Bowden wire wherein momentary engine acceleration occurs, is best shown by the dotted line position 42a of the button 42 in Fig. 1, but this movement is not of sufficient amount as to cause any appreciable movement of the lock out collar.

In the final movement of the Bowden wire, as best shown in the dotted line position 42b in Fig. 1, said wire acts to swing the arm 40 downwardly. This rocks the shaft 36 counterclockwise to swing the yoke 35 and thus shift the collar 33 rearwardly to operatively connect the two clutch members 27 and 29 together independently of the clutch spring. Sufficient friction is afforded the Bowden wire 41 in the casing parts 43 and 44 to hold the collar 33 in lock out position against the action of the spring 38.

In the momentary acceleration of the engine, the transmission being in gear, it is apparent that the clutch member 29 is brought up to substantially the speed of the clutch member 27 and is substantially synchronized therewith and is then clutched thereto through the action of the spring 31. In said momentary acceleration of the engine and as the collar 33 starts its shift to lock out position, the ends of its external spline teeth may possibly strike the ends of the external spline teeth 28 on the clutch member 27 in such relation that the lock out operation could not be accomplished or completed. However, at that instant the pawl 48 has snapped off and away from the finger 52, and deceleration of the engine commences. This causes a slight relative rotation between the collar 33 and clutch member 27 and changes the relation between the ends of the spline teeth mentioned so that said collar slides quietly and easily into lock out position. Thus, the two clutch members are substantially synchronized in the initial pull on the Bowden wire. In the final part of the pull on said wire, the collar 33 is shifted to lock the two clutch members 27 and 29 together independently of the clutch spring.

It is pointed out at this time that, due to the construction described, in the initial pull on the knob or button 42, the engine is momentarily accelerated and decelerated, the deceleration occurring in the final part of the pull on said knob. Thus the engine is caused to speed up the rotation of the clutch member 29 to bring it up to the speed of the other clutch member, thus synchronizing them, at which time the lock out movement is completed. The lock out is thereby accomplished in an easy and quiet manner and while the transmission is in gear. Preferably of course, such shift is made while foot pressure is relieved from the treadle and the automobile moving along at a moderate low speed.

It is apparent that when going into reverse, it is desirable to lock out the free wheeling action and positively connect the shafts 22 and 24 together. When the lever 12 is actuated to move the shift rod 22f rearwardly, so as to move the gear 22d rearwardly to be operatively driven from the reverse gear 22c and associated idler (not shown) the said rod will, because of its engagement with the yoke 35, swing the yoke 35 counterclockwise and compress the spring 38. When the yoke thus swings, it moves the collar 33 rearwardly to positively connect the clutch members 27—29 together.

When the lever 12 is again shifted to provide neutral for the transmission, this shifts the rod or rail 22f forwardly and carries the gear 22d out of operative engagement with the idler gear (not shown) associated with the reverse gear 22c. In the forward movement of said rod or rail, its rear end moves away from the yoke 35 which is then swung clockwise by the expanding action of the spring 38. In this clockwise movement of the yoke, it shifts the collar 33 forwardly to the position shown in Fig. 3 wherein free wheeling is reestablished. Thus in going into reverse the free wheeling is locked out and is reestablished in going out of reverse. By reason of the groove and spline connection between the yoke 35 and shaft 36, this locking out and reestablishing of free wheeling in no manner affects the shaft 36 or associated parts such as the arm 40 and Bowden wire 41.

While in describing the invention, I have referred in detail to the form, arrangement, and construction of the various parts thereof, the same is to be considered merely as illustrative, as I do not wish to be limited thereto except as may be specifically pointed out in the appended claims.

I claim as my invention:

1. In an automotive driving mechanism, a driving member, a driven member and a one way overrunning clutch therebetween, means for locking out said clutch for positively connecting said driving and driven members, and means for actuating said lock out means and including mechanism operating in the initial part of its movement to speed up one of said members and operating in the final part of its movement to complete the lock out operation.

2. An automotive driving mechanism embodying therein a transmission, an engine operatively connected thereto, and including an accelerating and decelerating means, a free wheeling clutch mechanism associated with said transmission and including a driving member, a driven member, and an overrunning clutch for operatively connecting them together in a relative rotative movement in one direction, means for locking out said overrunning clutch so as to positively connect said two members together independently of said overrunning clutch, and an actuating member operatively connected at one end to said last-mentioned means and formed at a point between said ends to actuate said engine accelerating and decelerating means to produce a momentary acceleration of the engine to speed up one of said members preliminary to completing the lock out operation.

3. An automotive driving mechanism embodying therein a transmission, an engine operatively connected thereto, and including an accelerating and decelerating means, a free wheeling clutch mechanism associated with said transmission and including a driving member, a driven member, and an overrunning clutch for operatively connecting them together in a relative rotative movement in one direction, means for locking out said overrunning clutch so as to positively connect said two members together independently of said overrunning clutch, and which means is longitudinally shiftable with respect to said driving and driven members, and an actuating member connected at one end to said longitudinally shiftable means and formed at a point between its ends to actuate said engine accelerating and decelerating means to produce a momentary acceleration of the engine to speed up one of said members preliminary to the final movement of said longitudinally shiftable means in completing the lock out operation.

4. An automotive driving mechanism embodying therein a transmission, an engine operatively connected thereto, and including an accelerating and decelerating means, a free wheeling clutch mechanism associated with said transmission and including a driving member, a driven member, and an overrunning clutch for operatively connecting them together in a relative rotative movement in one direction, means for locking out said overrunning clutch so as to positively connect said two members together independently of said overrunning clutch, and which means is longitudinally shiftable with respect to said driving and driven members, a rock shaft and operating arm operatively connected to said longitudinally shiftable means, and an actuating member operatively connected at one end to said operating arm and formed at a point between its ends to actuate said engine accelerating and decelerating means to produce a momentary acceleration of the engine to speed up one of said members preliminary to the final movement of said longitudinally shiftable means in completing the lock out operation.

5. In an automotive driving mechanism, an engine including an accelerating and decelerating means, a transmission and a free wheeling mechanism, a flexible member connected at one end to said free wheeling mechanism for locking out the same, means for actuating said engine accelerating and decelerating means and means including a part carried by said flexible member at a point between its ends for so engaging said engine accelerating and decelerating means as to operate the same to momentarily accelerate the engine in an initial part of the movement of said flexible member to lock out said free wheeling mechanism.

6. In an automotive driving mechanism, an engine including an accelerating and decelerating means, a transmission and a free wheeling mechanism, a flexible member connected at one end to said free wheeling mechanism for locking out the same, a spring pressed rod connected to said engine accelerating and decelerating means, a pawl on said rod, a second pawl on said flexible member at a point between its ends, and means between said pawls for translating the movement of the second pawl in one direction to a movement of the first mentioned pawl and its rod to momentarily accelerate the engine in the initial part of the movement of said flexible member to lock out said free wheeling mechanism.

7. An automotive driving mechanism embodying therein a driven shaft, a transmission including gearing operable to provide forward speeds and reverse for said shaft and means for manipulating said gearing to provide the desired speed forward or reverse, an engine operatively connected to said transmission, a free wheeling clutch associated with the transmission and shaft respectively, a collar associated with said clutch and shiftable from a free wheeling position into and out of a lock out position, a yoke normally engaged with said collar for shifting the same, a rock shaft on which said yoke is mounted with a lost motion connection, means for rocking said shaft in one direction to actuate the yoke in shifting the collar to lock out position and including mechanism for accelerating the engine for speeding up a part of said clutch prior to completing the shift of the collar to lock out position, and means operable in manipulating the gearing to provide reverse for said driven shaft for swinging the yoke on the rock shaft so as to shift said collar into lock out position without effecting a rocking movement of said rock shaft.

8. In an automotive driving mechanism, a driving member, a driven member and a one-way overrunning clutch therebetween, means for locking out said clutch so as to positively connect said driving and driven members, means for moving said lock-out means into lock-out position, and means for controling the speed of the driving member and actuated by said moving means in the initial part of its movement toward lock-out position to speed up the driving member, said speed controlling means in the final part of the movement of said moving member toward lock-out position, operating to slow down said driving member to permit the completion of the movement of the lock-out means into lock-out position.

9. In an automotive driving mechanism, a driving member, a driven member and a one way overrunning clutch therebetween, means for locking out said clutch for positively connecting said driving and driven members, and means for actuating said lock out means and including mechanism operating first to speed up the driving member and then to slow down said driving member and completing the lock out when said driving member is in said slowed down condition.

10. An automotive driving mechanism embodying therein a transmission, an engine operatively connected thereto, and a free wheeling clutch mechanism associated with said transmission, said clutch mechanism including a driving member, a driven member and an overrunning clutch element for connecting said members together in a relative rotative movement therebetween in one direction, means for positively connecting said driving and driven members together independently of said overrunning clutch, and means for actuating said last-mentioned means and including mechanism for accelerating said engine for speeding up one of said members preliminary to completing the lock out operation.

11. An automotive driving mechanism embodying therein a transmission, an engine operatively connected thereto, and a free wheeling clutch mechanism associated with said transmission, said clutch mechanism including a driving member, a driven member, and an overrunning clutch element for connecting said members together in a relative rotative movement therebetween in one direction, means for positively connecting said driving and driven members together independently of said overrunning clutch, and means for actuating said last-mentioned means and including mechanism for accelerating said engine for speeding up said driving member preliminary to completing the lock out operation.

12. An automotive driving mechanism embodying therein a transmission, an engine operatively connected thereto, and a free wheeling clutch mechanism associated with said transmission, said clutch mechanism including a driving member, a driven member, and an overrunning clutch element for connecting said members together in a relative rotative movement therebetween in one direction, means for positively connecting said driving and driven members together independently of said overrunning clutch, and means for actuating said last-mentioned means and including mechanism for accelerating said engine for speeding up one of said members to at least substantially that of the other member preliminary to completing the lock out operation.

13. An automotive driving mechanism embodying therein a transmission, an engine operatively connected thereto, and a free wheeling clutch mechanism associated with said transmission, said clutch mechanism including a driving member, a driven member, and an overrunning clutch element for connecting said members together in a relative rotative movement therebetween in one direction, means for positively connecting said driving and driven members together independently of said overrunning clutch, and means for actuating said last-mentioned means and including mechanism for accelerating said engine for speeding up one of said members and then decelerating said engine to slow down said one of said members preliminary to completing the lock out operation.

14. An automotive driving mechanism embodying therein a transmission, an engine including an accelerating and decelerating device, and which engine is operatively connected to said transmission and a free wheeling clutch mechanism associated with said transmission, said clutch mechanism including a driving member, a driven member, and an overrunning clutch for connecting said members together in a relative rotative movement therebetween in one direction, means for locking out said overrunning clutch and positively connecting said members together independently of said overrunning clutch, and means for actuating said last-mentioned means and including mechanism for actuating said device for causing acceleration of the engine for speeding up one of said members preliminary to completing the lock out operation.

15. An automotive driving mechanism embodying therein a transmission, an engine including an accelerating and decelerating device, and which engine is operatively connected to said transmission and a free wheeling clutch mechanism associated with said transmission, said clutch mechanism including a driving member, a driven member, and an overrunning clutch for connecting said members together in a relative rotative movement therebetween in one direction, means for locking out said overrunning clutch and positively connecting said members together independently of said overrunning clutch, and means for actuating said last-mentioned means and including mechanism for actuating said device for causing acceleration of the engine for speeding up one of said members and then causing deceleration of the engine for slowing down said one of said members preliminary to completing the lock out operation.

16. An automotive driving mechanism embodying therein a transmission, a free wheeling clutch mechanism an engine for driving the transmission, means for accelerating and decelerating said engine, said clutch mechanism including a driving member and a driven member and an overrunning clutch for operatively connecting them together in a relative rotative movement in one direction, means for locking out said overrunning clutch to positively connect said members together independently of said overrunning clutch, and means for actuating said last-mentioned means and including mechanism to momentarily actuate said accelerating and decelerating means preliminary to completing the lock out operation.

17. An automotive driving mechanism embodying therein a transmission, an engine at one end of said transmission and operatively connected thereto, and including accelerating and decelerating means, a free wheeling clutch mechanism at the other end of said transmission and including a driving member, a driven member, and an overrunning clutch for operatively connecting them together upon a relative rotation in one direction and means for locking out said overrunning clutch so as to positively connect said members together independently of said overrunning clutch, and means for actuating said last-mentioned means and including mechanism for actuating said accelerating and decelerating means to produce a momentary acceleration of the engine to speed up one of said members preliminary to completing the lock out operation.

18. An automotive driving mechanism embodying therein a transmission, an engine at one end of said transmission and operatively connected thereto, and including accelerating and decelerating means, a free wheeling clutch mechanism at the other end of said transmission and including a driving member, a driven member, and an overrunning clutch for operatively connecting them together upon a relative rotation in one direction, and means for locking out said overrunning clutch so as to positively connect said members together independently of said overrunning clutch, and means for actuating said last-mentioned means and including mechanism for actuating said accelerating and decelerating means to produce a momentary acceleration to bring up the driving member to the speed of the driven member preliminary to completing the lock out operation.

19. In a motor driven vehicle having motor speed controlling means and selective means for producing free-wheeling effects, wherein the selective free-wheeling means is controllable by a movable control member adapted to render the means for producing the free-wheeling effects operative when the control member is in one predetermined position and inoperative in a second predetermined position, means operative upon a change in the position of the control member from one position to another for operating the speed controlling means in a sense to increase temporarily the speed of the motor, said last named means comprising a link in operative engagement with both the speed controlling means and the movable control means.

20. In a motor vehicle having selective free-wheeling transmission means, driving and driven elements and means operable to connect interchangeably the driving and driven elements directly and through the free-wheeling means, means controlled by the operation of said interchangeably connecting means to control the driving element upon changing the connection between the driven and driving element from free-wheeling to direct connection to produce a speed of rotation of the driving element commensurate to the speed of the driven element.

21. In an automotive driving mechanism, an engine including an accelerating and decelerating means, a transmission and a free wheeling mechanism, an operable means connected to said free wheeling mechanism for locking out the same, means for actuating said engine accelerating and decelerating means and means interposed between said operable means and the accelerating and decelerating means for so engaging said engine accelerating and decelerating means as to operate the same to momentarily accelerate the engine in an initial part of the movement of said operable means to lock out the free wheeling mechanism.

WILLIAM C. STARKEY.